(12) United States Patent
Okada et al.

(10) Patent No.: US 6,233,929 B1
(45) Date of Patent: *May 22, 2001

(54) AXLE DRIVING APPARATUS

(75) Inventors: Hideaki Okada; Norihiro Ishii, both of Amagasaki (JP)

(73) Assignee: Kanzaki Kokyukoki Mfg. Co., Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/443,735

(22) Filed: Dec. 1, 1999

Related U.S. Application Data

(63) Continuation of application No. 09/129,957, filed on Aug. 6, 1998, now Pat. No. 6,073,443.

(30) Foreign Application Priority Data

| Aug. 6, 1997 | (JP) | 9-212051 |
| Sep. 30, 1997 | (JP) | 9-266806 |
| Oct. 1, 1997 | (JP) | 9-268684 |

(51) Int. Cl.$^7$ ............................. F16D 31/02; F16D 39/00
(52) U.S. Cl. .................. 60/456; 60/487; 60/488
(58) Field of Search ............................ 60/456, 487, 488, 60/489

(56) References Cited

U.S. PATENT DOCUMENTS

| 3,654,761 | 4/1972 | Eickmann . |
| 5,394,699 | 3/1995 | Matsufuji . |
| 5,515,747 | 5/1996 | Okada et al. . |
| 5,622,051 | 4/1997 | Iida et al. . |
| 5,802,851 | 9/1998 | Krantz . |
| 6,073,443 | * 6/2000 | Okada et al. . |

FOREIGN PATENT DOCUMENTS 3-159822  9/1991  (JP) .

* cited by examiner

*Primary Examiner*—Hoang Nguyen
(74) *Attorney, Agent, or Firm*—Sterne, Kessler, Goldstein & Fox P.L.L.C.

(57) ABSTRACT

A hydrostatic transmission (HST) including a hydraulic pump is contained in a housing having upper and lower housings. An input shaft of the hydraulic pump projects outward from the upper housing. A cooling fan is provided on an upper end of the input shaft. A conduit is disposed within an area between the fan and the upper housing. The conduit extends between first and second couplings and is in communication with an oil sump formed in the housing. A pumping device, which rotates with the input shaft, is disposed within the second coupling for forcedly circulating oil between the conduit and the sump. Alternatively, a reservoir is disposed on an outer wall of the housing forming a second oil sump. A level of oil in the second oil sump is lower than a level of oil in the oil sump formed in the housing. The second oil sump communicates with the atmosphere whereas the oil sump formed in the housing is separated from the atmosphere. A siphon communicates both sumps with each other. The driving apparatus may incorporate either the conduit, the reservoir, or both the conduit and the reservoir.

9 Claims, 20 Drawing Sheets

AXLE DRIVING APPARATUS

This application is a continuation of application Ser. No. 09/129,957; Filed: Aug. 6, 1998, now U.S. Pat. No. 6,073,443.

BACKGROUND OF THE INVENTION

1. Field of the Invention

The present invention relates to an axle driving apparatus including a housing and a hydrostatic transmission (HST) contained in the housing. More particularly, it relates to a cooling system for oil in the housing, an arrangement of an oil reservoir for regulating the volume of oil in the housing, and a cooling system for cooling oil in the reservoir in combination with an oil reservoir.

2. Related Art

An axle driving apparatus generally includes an HST having a hydraulic pump and a hydraulic motor fluidly connected with each other, a differential gear unit, and a transmission between a motor shaft of the HST and the differential gear unit. The HST is immersed in an oil sump formed in a housing. Such an axle driving apparatus is generally air-cooled by a cooling fan provided on an input shaft of the hydraulic pump projecting outward from the housing and by fins formed on an outer wall of the housing.

As described in Japanese Laid-Open Gazette Hei. 3-159822, a known axle driving apparatus includes a housing, an interior thereof being divided into first and second chambers. The first chamber contains a hydraulic pump and a hydraulic motor of an HST, and the second chamber contains a differential gear unit and a gear train forming the transmission. An oil reservoir is disposed above the first chamber.

When such a conventional axle driving apparatus utilizes the above mentioned air-cooling system having a cooling fan, the oil located in the housing is not sufficiently cooled by air-cooling the wall of the housing. Thus, the efficiency and life of the HST are reduced.

Known oil reservoirs, as shown by Japanese Laid-Open Gazette Hei. 3-159822, project upwardly from the housing whereby a large vertical space is required for mounting the axle driving apparatus on a vehicle. Also, reservoirs which are disposed so high are generally juxtaposed with an input shaft of the HST which projects vertically upward from the housing. Thus, the reservoir is removed from the air-cooled area exposed to the cooling wind of the cooling fan. Thus, oil in the reservoir cannot be sufficiently cooled by the cooling fan.

When the oil is not cooled sufficiently, the temperature of the oil increases and the HST cannot operate smoothly.

SUMMARY OF THE INVENTION

An object of the present invention is to provide an effective oil cooling system for an improved axle driving apparatus including an HST contained in a housing having a cooling fan disposed at an exterior of the housing for sufficiently cooling the HST and other components contained in the housing.

To achieve the first object, an oil passage is disposed in an air-cooled area in which the wind generated by the cooling fan blows. The cooling fan is provided on an input shaft of the HST which projects outward from the housing. A chamber is formed in the housing. The chamber is filled with oil, thereby defining an oil sump. The HST is housed in the chamber and immersed in the oil sump. The oil passage leads oil from the oil sump through one port and returns it to the oil sump through another port. Oil is cooled more effectively by the cooling fan while flowing through the oil passage as compared to oil in the chamber which is cooled by fanning the housing alone.

At least one of the ports is provided with a pump driven by the input shaft for circulating oil between the oil sump and the oil passage. Accordingly, a substantially continuous flow of oil cooled while flowing through the oil passage flows into the chamber. Simultaneously, a substantially continuous flow of oil flows from the chamber through the other negatively pressurized port for cooling. While the input shaft is rotated, oil circulates substantially continuously between the oil sump and the oil passage whereby the oil sump is always supplied with cool oil. Thus, the HST and other components of such an axle driving apparatus are effectively cooled.

A second object of the invention is to provide an axle driving apparatus including a housing, an HST located in the housing, and a second oil sump (e.g., a reservoir) which regulates the volume of the oil in the housing, wherein the second sump is disposed in a manner that provides a compact design and provides an effective cooling system for the oil in the second oil sump.

To achieve the second object, an input shaft of the HST projects outward from the housing and is oriented substantially vertically. The second oil sump is disposed in an air-cooled area below a cooling fan mounted on a portion of the input shaft which projects out of the housing. The second oil sump effectively receives the wind of the fan, thereby sufficiently cooling the oil in the second oil sump.

The level of the second oil sump is lower than that of a first oil sump in the housing (i.e., a conventional oil sump). The second oil sump may be located on any outer wall area of the housing. Thus, placing the second oil sump on an advantageous area of the housing allows the apparatus to be entirely compacted, whereby the vertical space required for attaching the apparatus to a vehicle is reduced.

A siphon interconnects the second sump and the first sump in the housing, thereby enabling oil to flow between the sumps in both directions. Thus, the volume of oil in the first sump can be simply regulated.

Preferably, a reservoir defining the second sump is mounted on a wall of the housing. Such a reservoir includes a pair of side surfaces which face each other. A pair of first fixtures is located on the pair of sides, respectively. The housing is provided with second fixtures corresponding to the first fixture. The first fixtures are either concave or convex. The second fixtures are shaped to engage with the first fixtures, respectively, and are provided at the both ends of a U-shaped modifiable elastic plate.

Since the reservoir of the present invention is mounted on the wall of the housing, it is easily assembled, simply and firmly mounted upon the wall of the housing. In this regard, the fixtures allow the reservoir to be quickly removed and mounted on the housing. The fixtures are produced easily and at a low cost due to the simple construction.

To achieve both the first and second objects simultaneously, the second oil sump and the oil passage for circulating the oil of the first oil sump are disposed in the air-cooled area of the fan. The siphon is provided for enabling a portion of oil in the oil passage to flow into the second oil sump.

In this construction, the oil passage is made of a conduit having couplings provided at both of ends of the conduit. The housing is provided with a pair of outward openings for communicating the oil passage with the first sump. The couplings cover respective openings. The siphon branches from one of the couplings.

These and other objects, features and advantages of the invention will become more apparent from the detailed description and drawings which follow.

DETAILED DESCRIPTION OF THE PREFERRED EMBODIMENTS

With the above mentioned and other objects in view, the scope of the present invention includes the construction fully described below, illustrated in the accompanying drawings, and set forth in the appended claims, it being understood that various changes in the operation, form, proportion and minor details of construction, within the scope of the claims, may be modified without departing from the spirit of the present invention or sacrificing any of the advantages thereof.

Explanation will be given on an axle driving apparatus in accordance with a first embodiment of the present invention provided with an oil passage disposed external to a housing of the axle driving apparatus. Oil flows out from a chamber formed in the housing and is directly air-cooled by a cooling fan.

Figure 1:
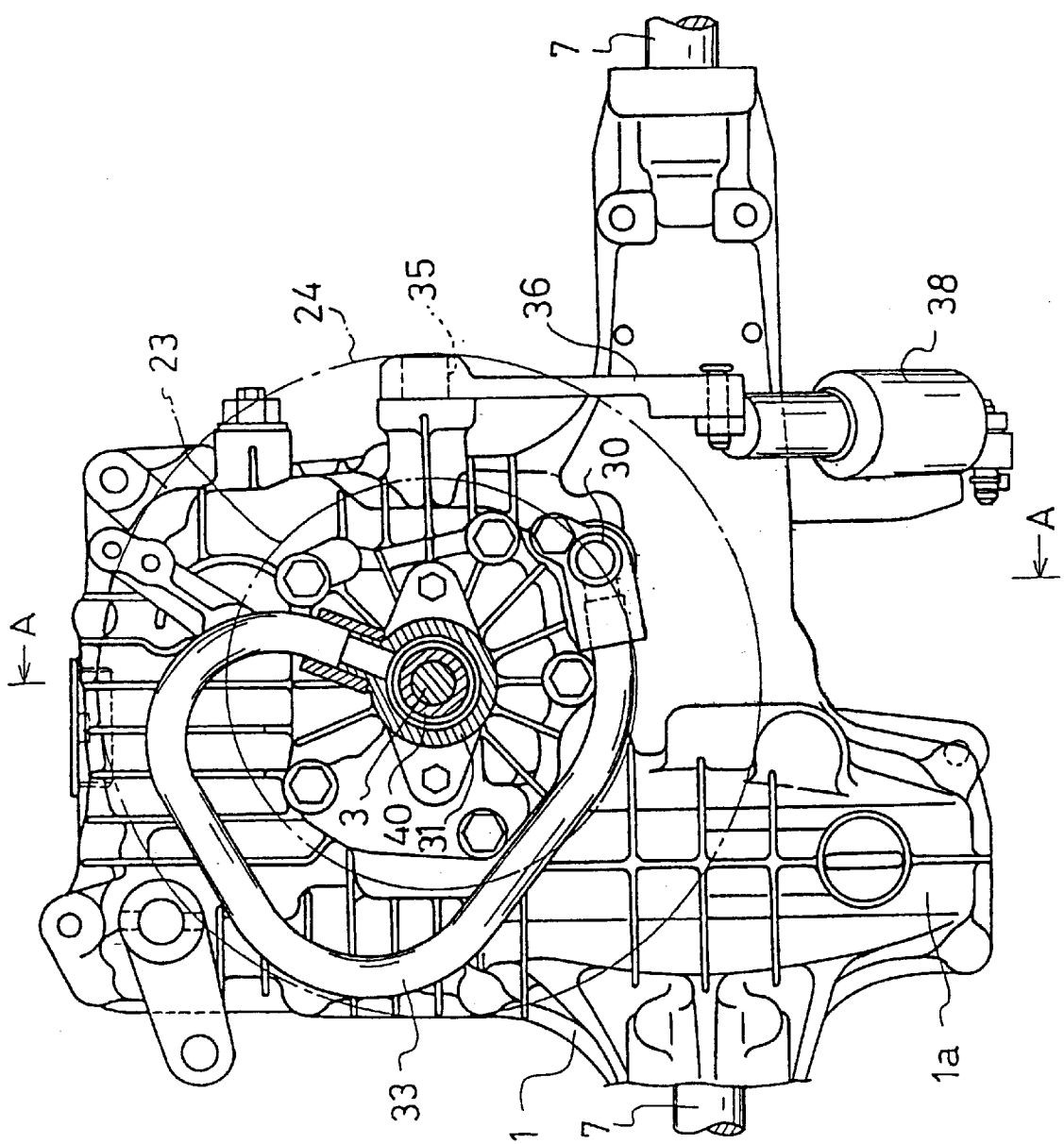
FIG. 1 is a plan view of an axle driving apparatus in accordance with a first embodiment of the present invention.
Figure 2:
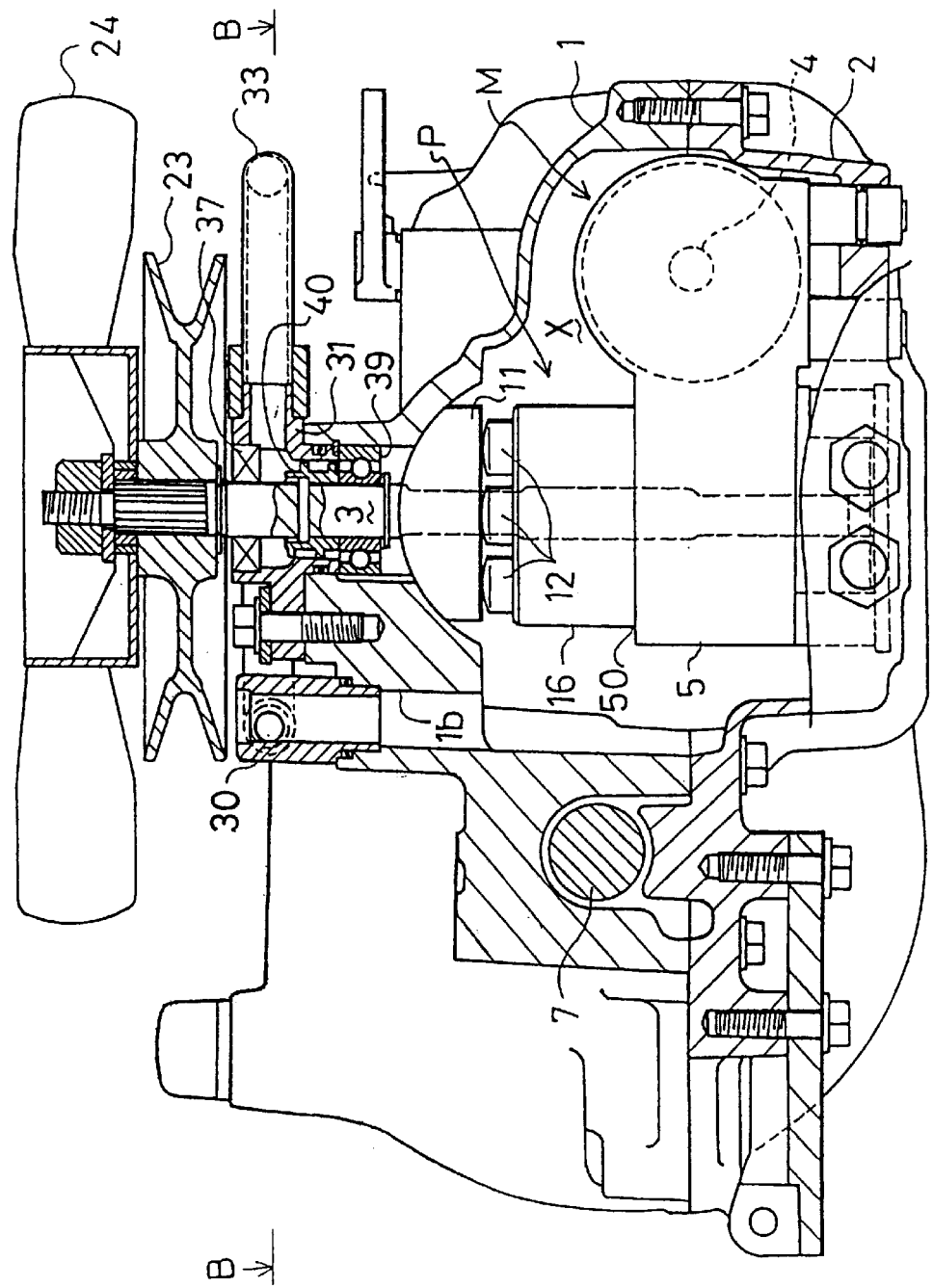
FIG. 2 is a section taken along line 2—2 in FIG. 1.

An axle driving apparatus in accordance with the first embodiment of the present invention is shown in FIGS. 1 and 2. A housing includes an upper housing 1 and a lower housing 2 which are joined with each other along respective flat horizontal joint surfaces. Left and right axles 7 and a motor shaft 4 are rotatably supported by bearings retained between housings 1 and 2. Axles 7 are differentially connected with each other through a differential gear unit (not shown). Outer ends of axles 7 project laterally outward from the housing.

A chamber in the housing is filled with oil so as to define an oil sump X (the reference numeral X designates a first oil sump of the second and third embodiments discussed below). The oil in the housing serves as lubricating oil and as operating oil for an HST. The HST includes a hydraulic pump P, a hydraulic motor M, a center section 5 fluidly interconnecting pump P and motor M, a differential gear unit and a transmission between shaft 4 of motor M and the differential gear unit, all of which are immersed in sump X.

Center section 5, which is fixed on the housing in sump X, has a horizontal axial area and a vertical axial area. A pump mounting surface 50 is formed on the upper surface of the horizontal axial area. A cylinder block 16 is rotatably mounted on surface 50. A plurality of pistons 12 are reciprocally inserted respectively into a plurality of cylindrical holes of block 16 with biasing springs. Each piston 12 includes a head which abuts against a movable swash plate 11. An input shaft 3 forms the pump shaft. Input shaft 3 is disposed along the rotational axis of block 16 and rotates integrally with block 16.

An upper portion of input shaft 3 projects upward from an upper wall of the housing 1. An input pulley 23 provided with a cooling fan 24 is fixed onto the upper end of input shaft 3.

The quantity and direction of oil discharged from pump P can be changed by varying the angle at which the surface of swash plate 11 abuts against pistons 12 with respect to the rotational axis of block 16. A control shaft 35 is rotatably supported by a side wall of housing 1. An arm is provided on one end of shaft 35 for engaging a side surface of swash plate 11. A control lever 36 is fixed onto the other end of shaft 35. Control lever 36 is connected to a speed controller (not shown) provided on a vehicle by a linkage or other suitable means. For example, control lever 36 may be operably connected to an accelerator pedal or a throttle lever. A shock absorber 38 is interposed between control lever 36 and housing 2 for dampening any shock upon on control lever 36 while operating the speed controller of the vehicle.

A motor cylinder block and motor pistons, similar in form as those of pump P, are provided on a motor mounting surface formed on a side surface of the vertically axial area of section 5. The heads of the motor pistons abut against a swash plate fixed onto the housing. Shaft 4 is disposed along the rotational axis of the motor cylinder block and rotates integrally with the motor cylinder block.

The driving power of shaft 4 is transmitted into the differential gear unit through a transmission (not shown), and thus drives axles 7.

Explanation will now be given on an oil cooling system in accordance with the first embodiment of the present invention.

Figure 3:
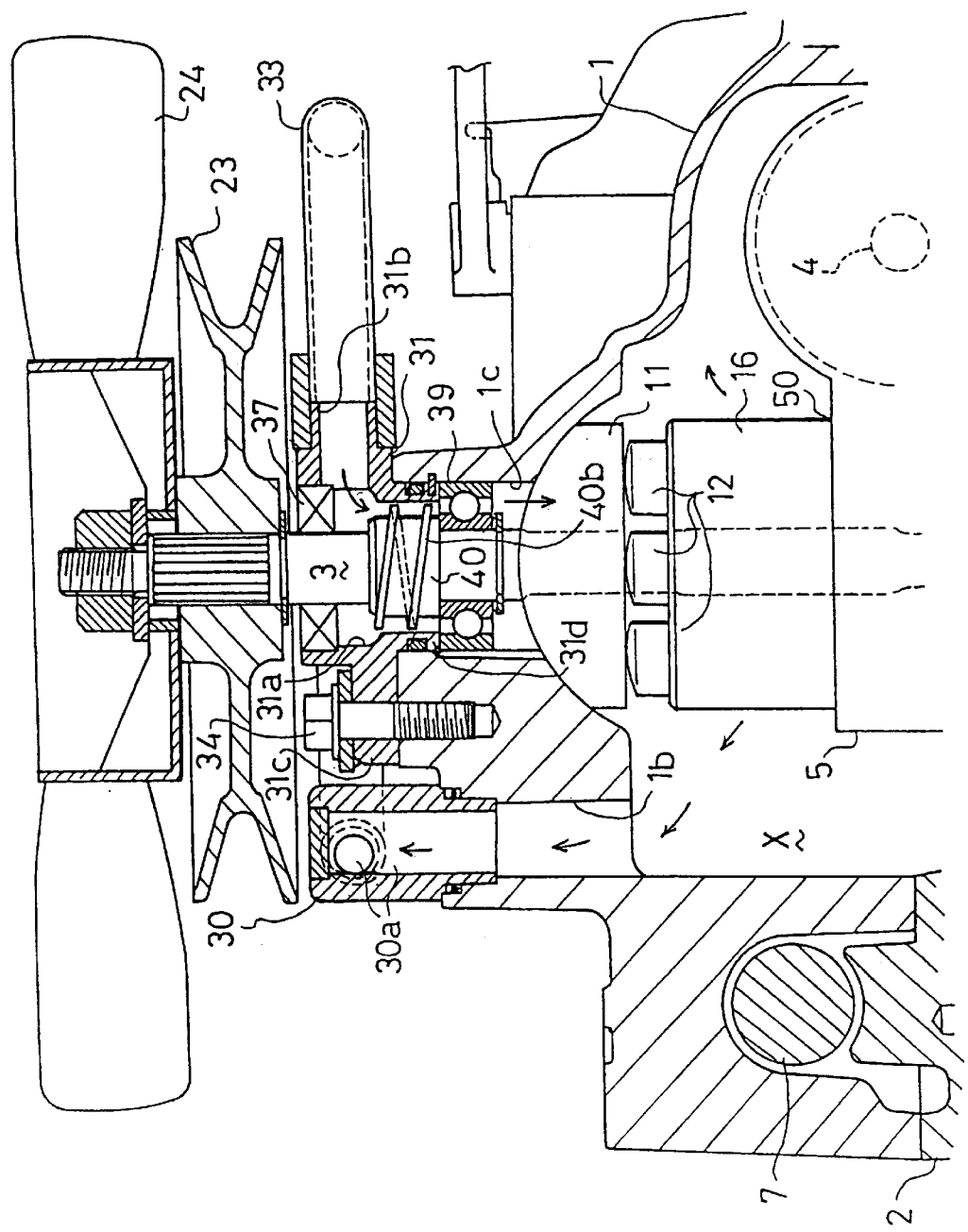
FIG. 3 is an enlarged view of first and second couplings shown in FIG. 2.
Figure 4:
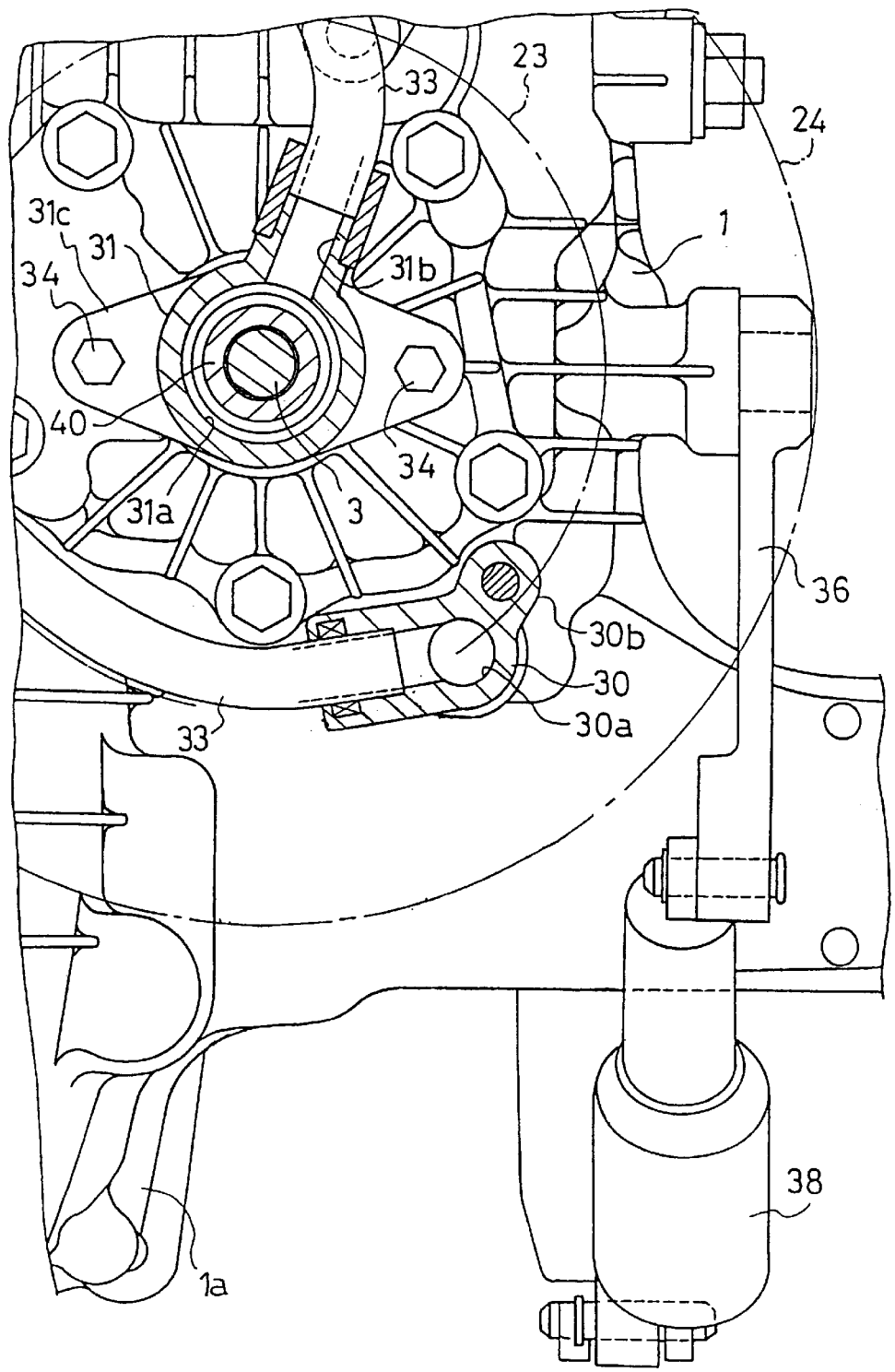
FIG. 4 is a section taken along line 4—4 in FIG. 2.
Figure 5:
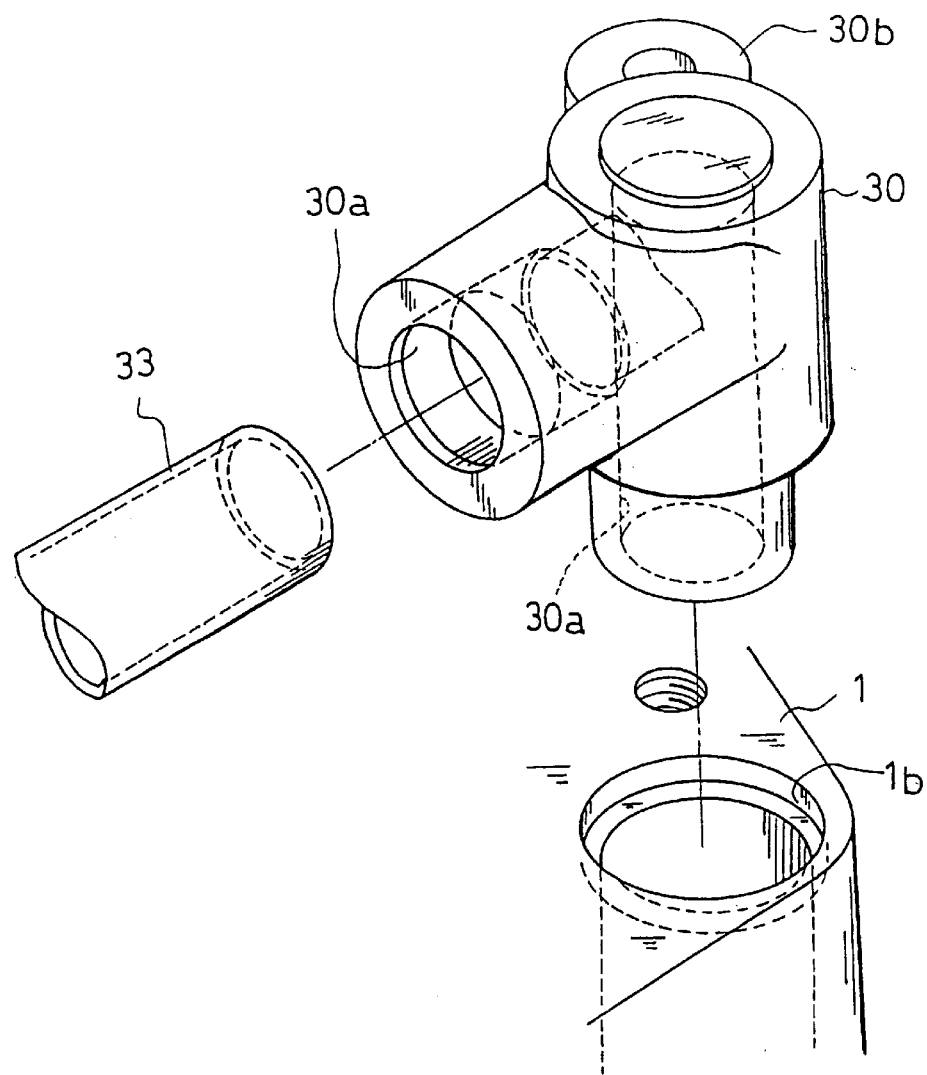
FIG. 5 is a perspective view of the first coupling of the first embodiment of the present invention.

FIGS. 3, 4 and 5 show a first coupling 30 which forms an L-shaped oil channel 30a therein. A lower end of coupling 30 is inserted into an opening 1b in an upper area of housing 1. Thus, channel 30a is connected with sump X through opening 1b.

One end of a cooling conduit 33 is connected to an end of channel 30a which opens at a side surface of coupling 30. Conduit 33 is preferably formed by a metal pipe having a high thermal conductivity. Conduit 33 may also include a plurality of fins along its periphery. Conduit 33 is disposed within the air-cooled area below fan 24. Referring to the embodiment shown in FIGS. 1 and 2, conduit 33 is disposed between the upper surface of housing 1 and a lower end of fan 24 and extends around shaft 3.

Another end of conduit 33 is connected to a second coupling 31 disposed adjacent to a bearing which supports input shaft 3. As shown in FIGS. 3 and 4, the center of coupling 31 includes a through-hole 31a through which shaft 3 extends. An oil channel 31b in communication with hole 31a opens at a side surface of coupling 31. Conduit 33 is connected to the side opening of channel 31b. A flange 31c of coupling 31 is fastened to the upper surface of housing 1 by bolts 34. A small diametric projection 31d, which projects downward from a lower end of coupling 31, is inserted into an opening 1c. Shaft 3 is rotatably supported by a bearing 39 which is disposed adjacent to the lower end of coupling 31. The top of opening 1c is covered with a seal 37.

Figure 6:
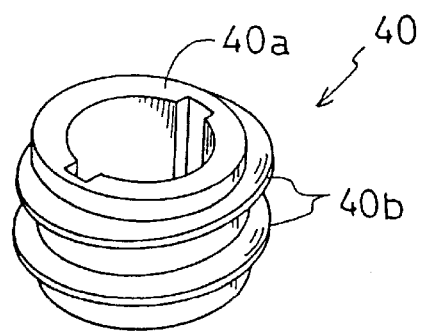
FIG. 6 is a perspective view of a pumping means.

A pumping means 40, disposed within housing 1, is provided on shaft 3 above bearing 39. As shown in FIG. 6, pumping means 40 comprises a tubal base 40a and a spiral 40b wound around base 40a. Base 40a is non-rotatably affixed to shaft 3. As spiral 40b and shaft 3 rotate, the oil in coupling 31 flows in the direction of the arrows shown in FIG. 3, i.e., downward into sump X. One skilled in the art would recognize that spiral 40b may be formed in the opposite direction wherein the oil would move against the arrows and flow from sump X into coupling 31.

In accordance with the first embodiment, when pulley 23 receives driving power, fan 24 rotates together with shaft 3 and air-cools conduit 33 and the housing thereby cooling the oil in them. In particular, the oil flowing through conduit 33 is cooled more effectively than the oil located in sump X because conduit 33 is directly exposed to the cooling-wind of fan 24. As pump means 40 rotates with input shaft 3, the cooled oil in conduit 33 flows down into sump X through coupling 31. The oil of sump X, in turn, is drawn into conduit 33 through coupling 30 because the interior of conduit 33 is negatively pressurized by the flow of oil through conduit 33.

Accordingly, the oil of sump X is forcedly circulated while shaft 3 is rotated. The oil is substantially continuously drawn into coupling 30, flows through conduit 33, and returns into sump X through coupling 31. The oil is cooled by fan 24 while it flows through conduit 33. Sump X is continuously supplied with the cooled oil, and is thus also forcedly cooled. Thus, the efficiency and life of the various components of the HST is increased.

Figure 7:
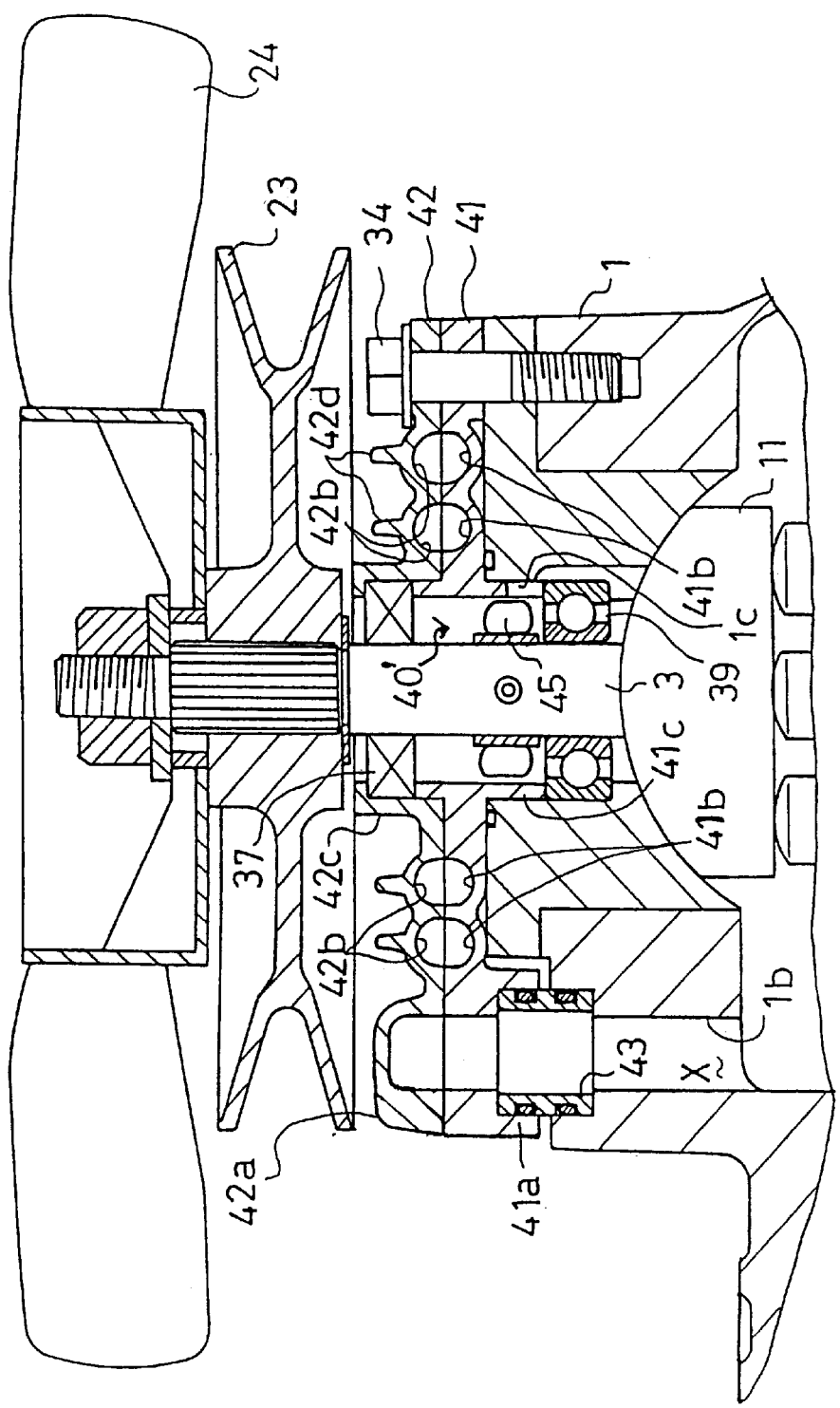
FIG. 7 is a sectional side view showing a modification of the first embodiment, wherein a plate member disposed within an air-cooled area forms an oil passage.
Figure 8:
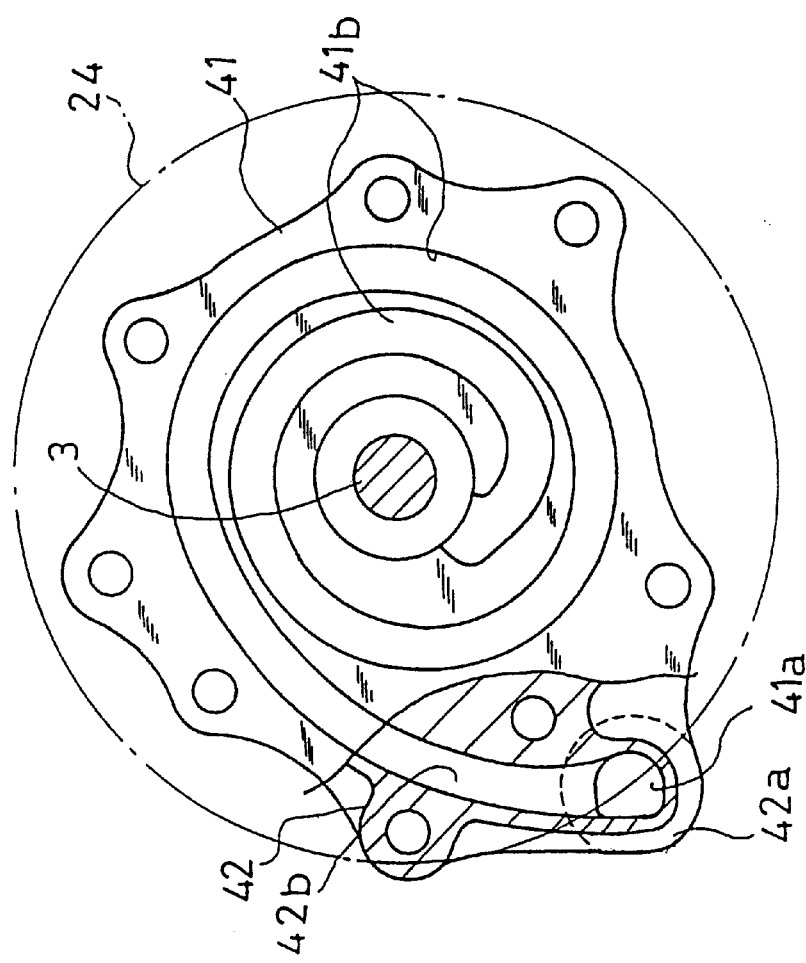
FIG. 8 is a plan view partly in section of the plate member shown in FIG. 7.

The oil passage may also be formed by a plate member instead of conduit 33. As shown in FIGS. 7 and 8, an upper plate 42 is laid on top of a lower plate 41 in the air-cooled area below fan 24. Plates 41 and 42 are screwed together and mounted on the upper surface of housing 1 by bolts 34. A port 41a projects downward from a peripheral side of plate 41 instead of coupling 30. Port 41a is connected to opening 1b through a joint pipe 43.

Port 41a cooperates with a port 42a which located on an interior side of plate 42 to form an entrance. Channels 41b and 42b, formed respectively on interior sides of plates 41 and 42, coincide with each other between plates 41 and 42 and define an oil channel. Channels 41b and 42b form a volute or spiral leading from ports 41a and 42a toward shaft 3. Plates 41 and 42 include ports 41c and 42c at the ends of channels 41b and 42b, respectively, wherein ports 41c and 42c define a discharge port. In the same manner as coupling 31 discussed above, port 41c projects downward from plate 41 into opening 1c and surrounds input shaft 3. A plurality of fins 42d are provided on the upper surface of plate 42 for improving air-cooling by convection.

An impeller 45 is fixed onto shaft 3 and disposed within port 41c, thereby forming a pumping means 40'. Rotation of impeller 45 together with shaft 3 forces the oil to flow through the oil channel. The oil flowing through the oil channel is cooled by fan 24 and substantially continuously flows into sump X through the discharge port.

Next, explanation will be given on an axle driving apparatus in accordance with a second embodiment of the present invention, wherein an oil reservoir is provided external of the housing for the purpose of regulating the volume of oil in the chamber.

Figure 9:
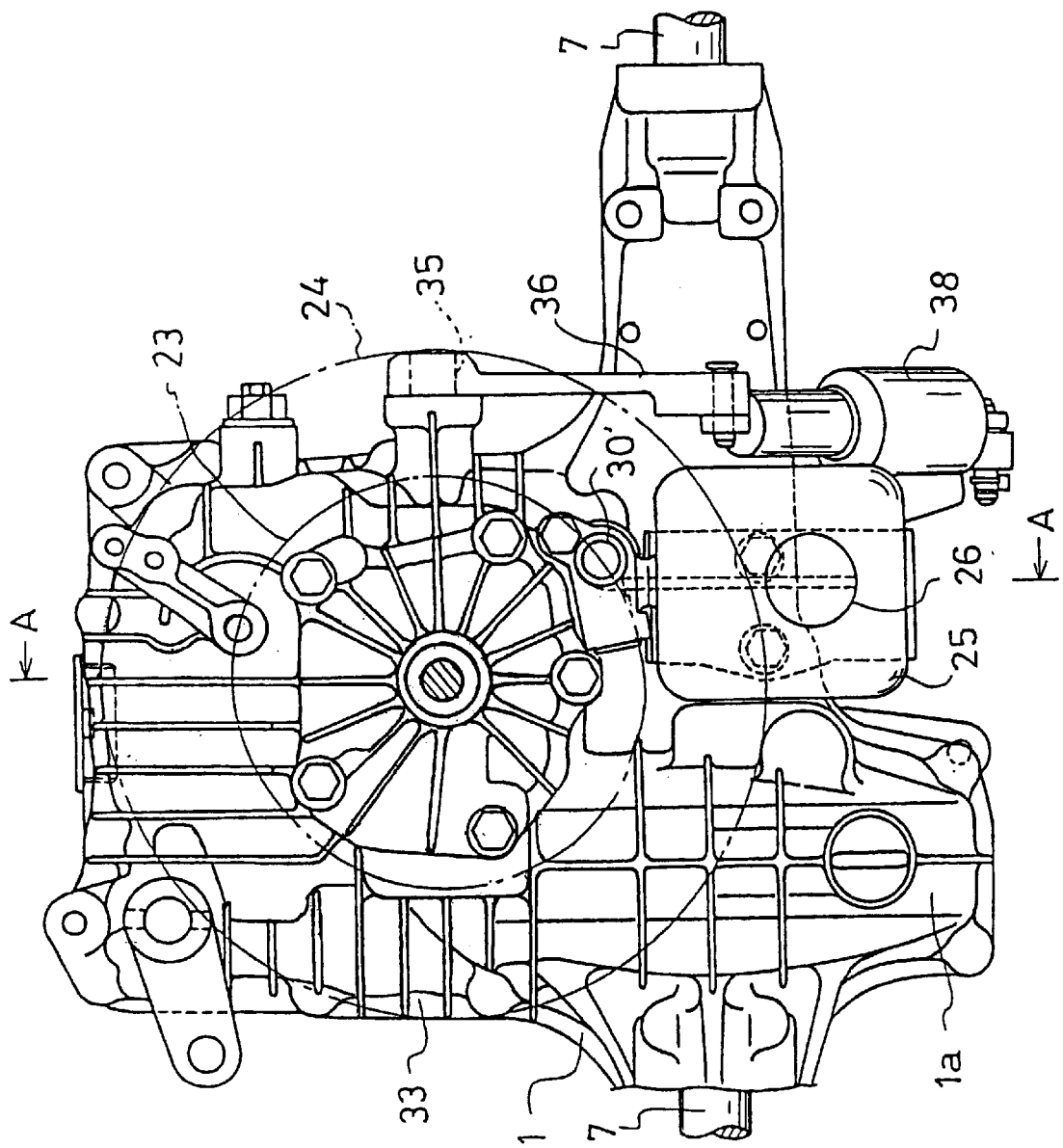
FIG. 9 is a plan view of an axle driving apparatus in accordance with a second embodiment of the present invention.
Figure 10:
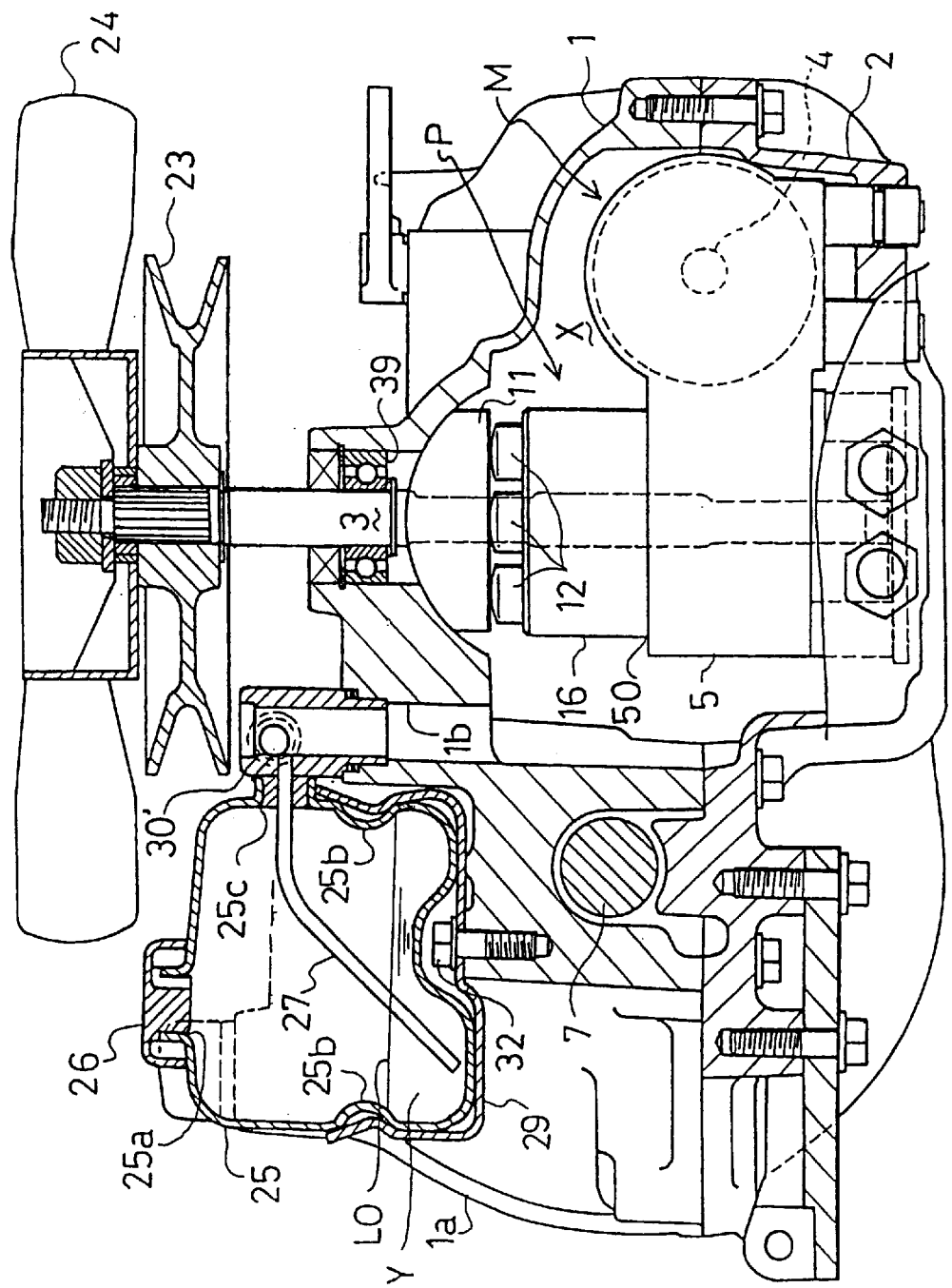
FIG. 10 is a section taken along line 10—10 in FIG. 9.

An axle driving apparatus in accordance with a second embodiment of the present invention is shown in FIGS. 9 and 10. Like reference numbers indicate identical or functionally similar elements as those of the first embodiment. In addition to first sump X defined by the housing chamber, which is filled with oil for lubricating and operating the HST, a second oil sump Y is formed by an oil reservoir 25 disposed on an outer wall of the housing.

Figure 11:
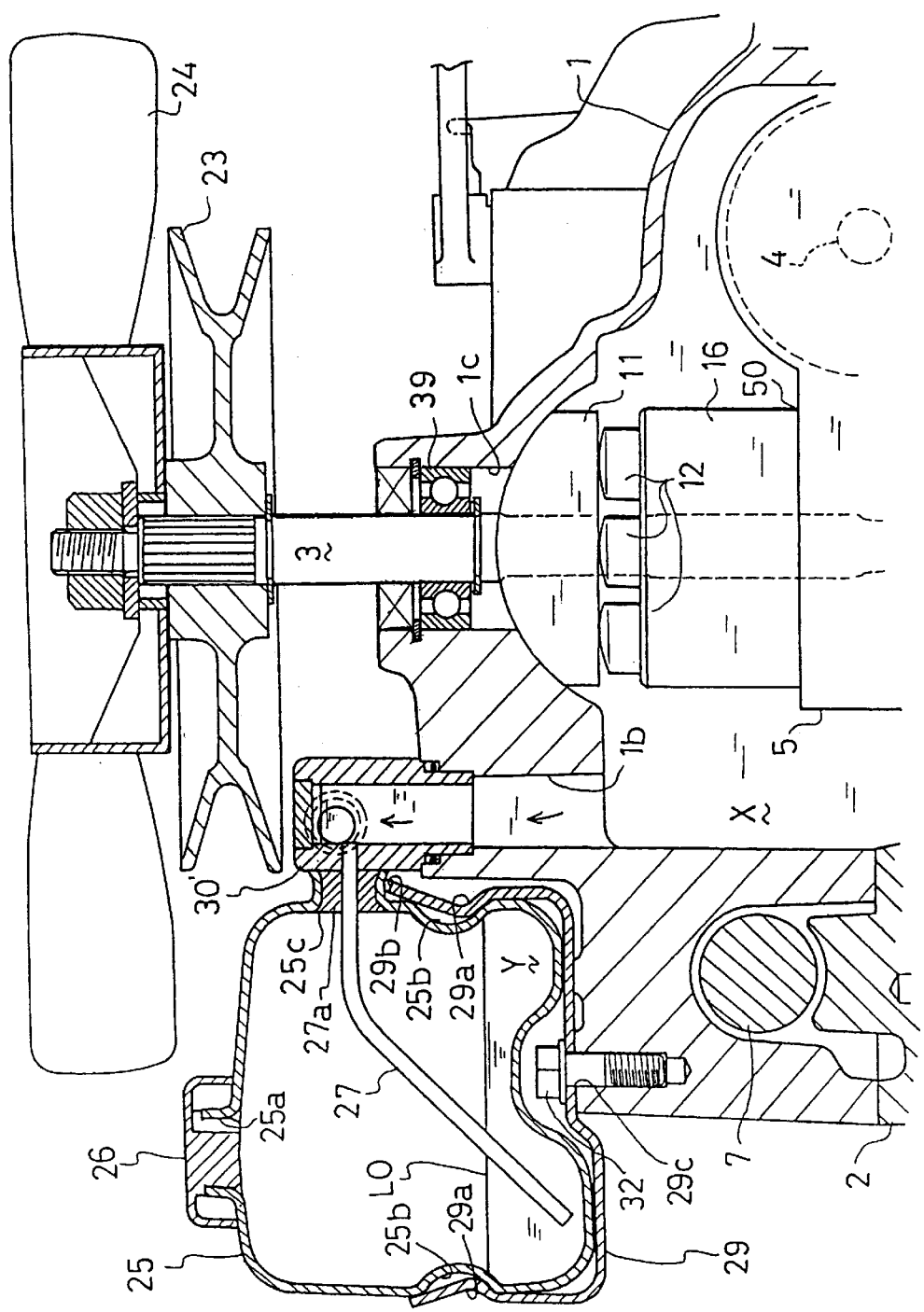
FIG. 11 is an enlarged view of a port between first and second oil sumps shown in FIG. 10.
Figure 13:
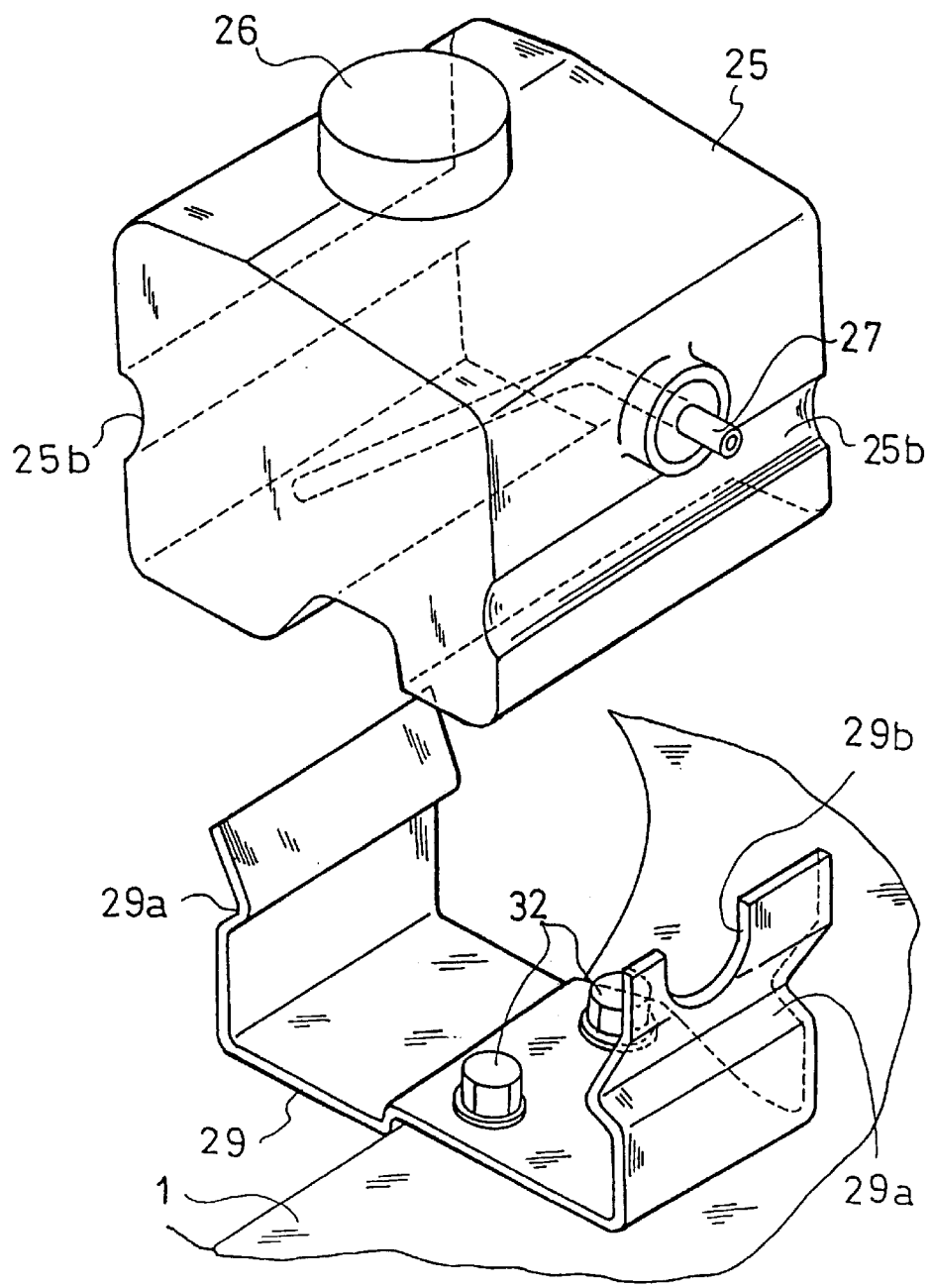
FIG. 13 is a perspective view of an oil reservoir and an attaching member therefor of the second embodiment of the present invention.

As shown in FIGS. 11 and 13, reservoir 25 may include a rectangular synthetic resinous tank. Reservoir 25 holds a quantity of oil thereby forming sump Y. An upper surface of reservoir 25 includes an opening 25a for filling it with oil. Opening 25a is covered with a cap 26 having a breather which communicates the interior of reservoir 25 with the atmosphere. Unlike sump Y, sump X is closed, and thus separated from the atmosphere.

A pair of first fixtures 25b are respectively formed on two surfaces of reservoir 25 which face each other (e.g., front and rear surfaces). First fixtures 25b may be formed with a lateral channel or a concave shape. Alternatively, one skilled in the art would recognize that first fixtures 25b may also be rail-shaped or convex.

An opening 25c is provided in one side surface (e.g., the front surface) of reservoir 25. A slender pipe, or a siphon 27, is inserted into opening 25c through a seal 27a. One end of siphon 27 extends toward an inner bottom surface of reservoir 25 in such a manner that the end of siphon 27 is always submerged in the oil in sump Y.

An attaching member 29 removably mounts reservoir 25 onto an upper surface of a portion of the housing which encloses axles 7. Attaching member 29 includes a U-shaped, bendable elastic plate (e.g., a metal or synthetic resinous plate). The span between a pair of upwardly extending front and rear sidepieces of member 29 is approximately as long as the longitudinal length of reservoir 25. Thus, reservoir 25 may be pressed down between the sidepieces of member 29 and firmly held in place by the sidepieces. Additionally, convex or recessed second fixtures 29a are formed in the front and rear sidepieces of member 29. Second fixtures 29a cooperate with respective first fixtures 25b, thereby firmly anchoring reservoir 25.

A channel 29b is provided at the upper end of the front sidepiece of member 29. Opening 25c forms a boss, wherein the boss is inserted into channel 29b when reservoir 25 is anchored. Accordingly, lateral movement of reservoir 25 is prevented and reservoir 25 cannot disengage member 29.

Through-holes 29c are bored at a central bottom portion of member 29. Bolts 32 inserted in through-holes 29c secure the bottom portion to the upper surface of the portion of the housing which contain axles 7. As shown in FIGS. 9 and 10, an expanded area la of the housing, which houses the differential gear unit, forms a concave portion in which reservoir 25 is disposed. Thus, reservoir 25 overlaps area la when viewed from the side, whereby reservoir 25 does not project forwardly from an area of the housing which includes the chamber defining sump X. The upper end of reservoir 25 is disposed lower than fan 24 and within the air-cooled area, whereby reservoir 25 is exposed to the cooling effect of fan 24. Accordingly, reservoir 25 partly overlaps fan 24 when viewed from above as shown in FIGS. 9 and 12.

Figure 12:
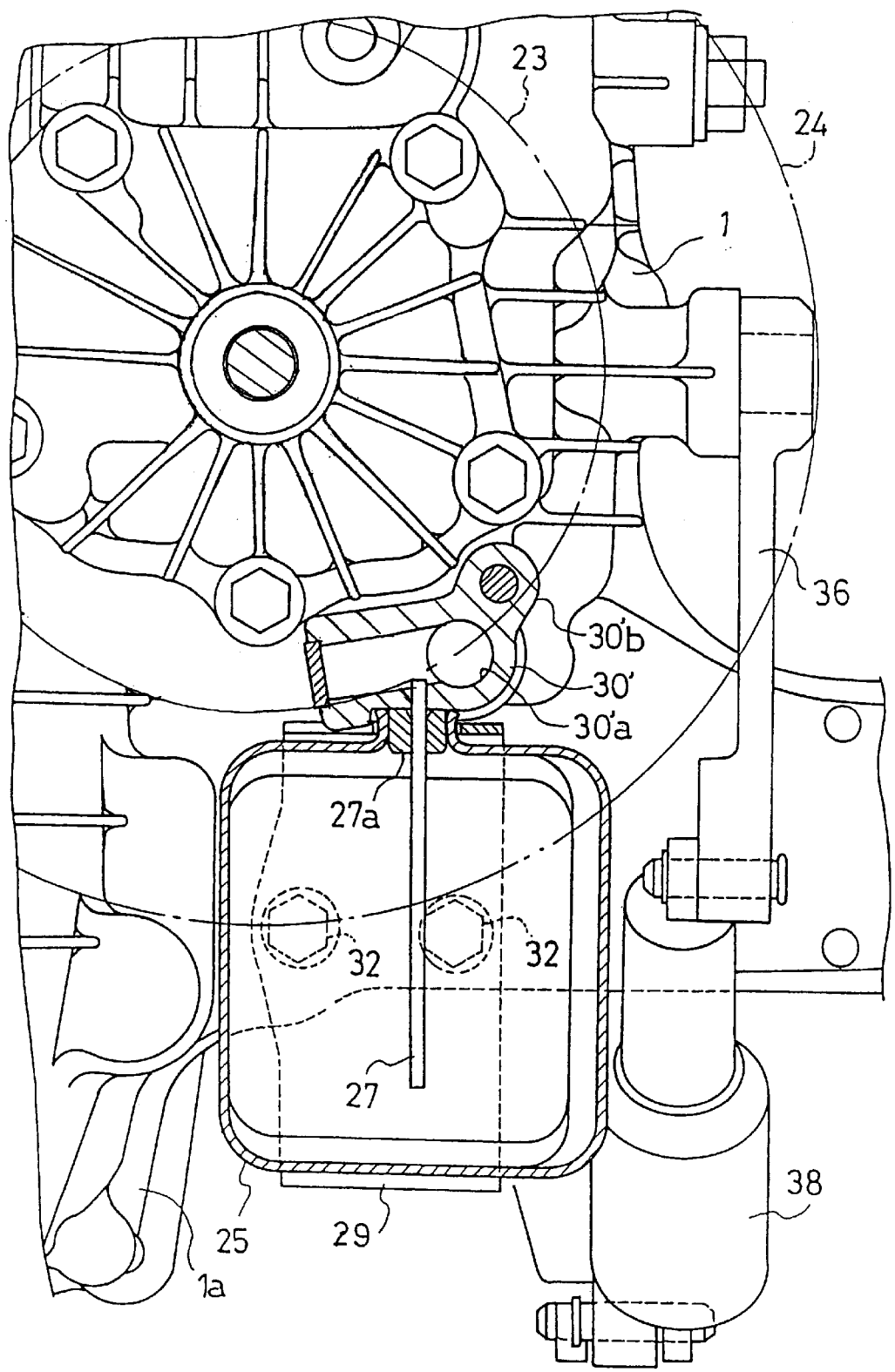
FIG. 12 is an enlarged plan view partly in section of the port between first and second oil sumps shown in FIG. 10.
Figure 14:
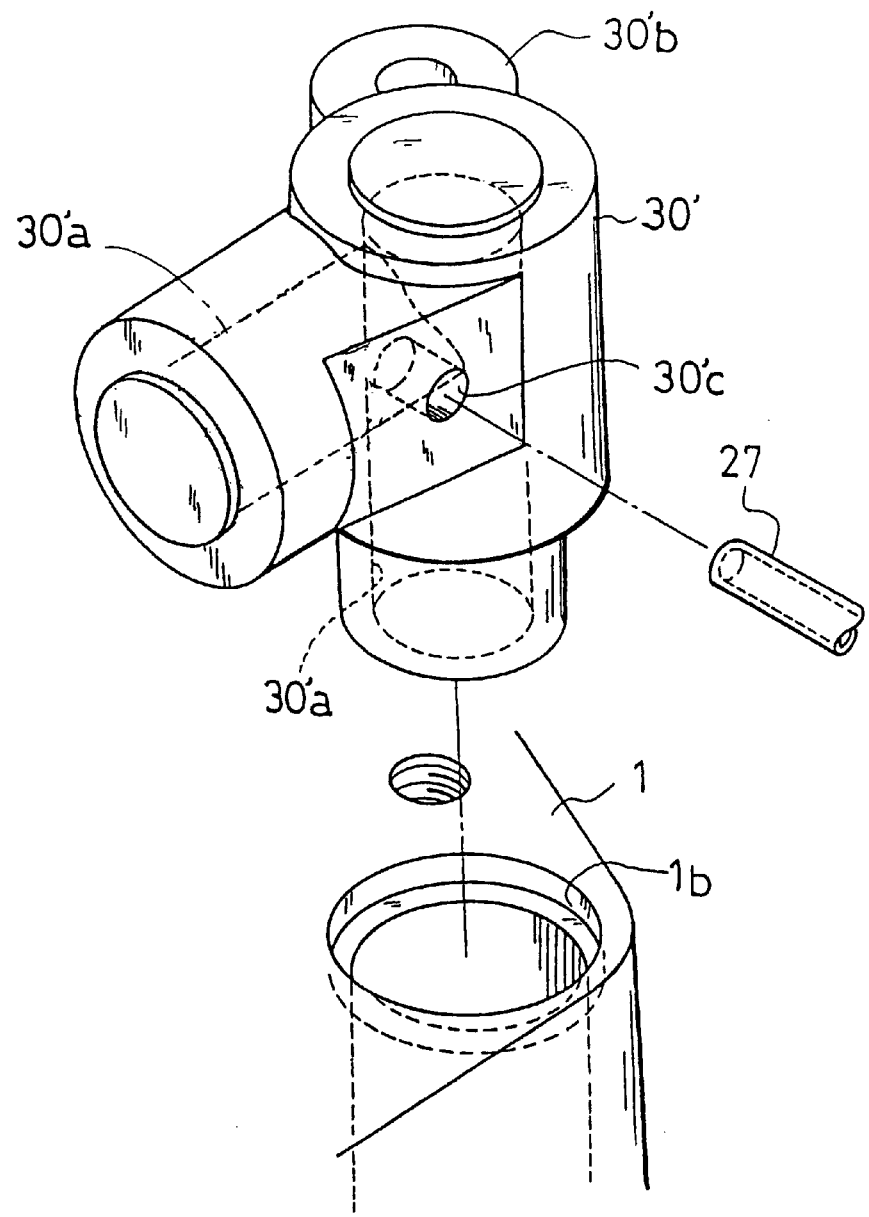
FIG. 14 is a perspective view of a coupling as a connecting means between the first and second oil sumps.
Figure 15:
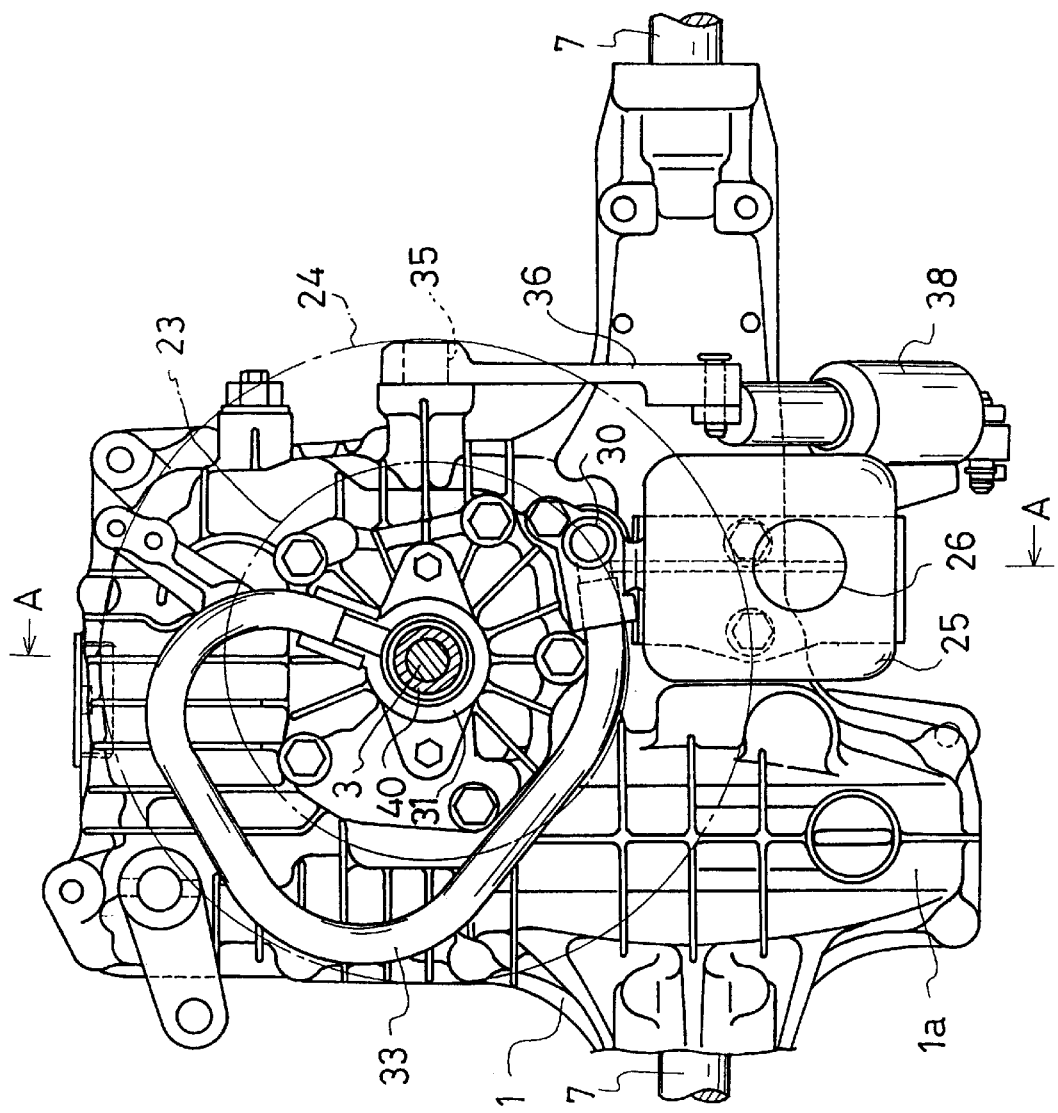
FIG. 15 is a plan view of an axle driving apparatus in accordance with a third embodiment of the present invention.
Figure 16:
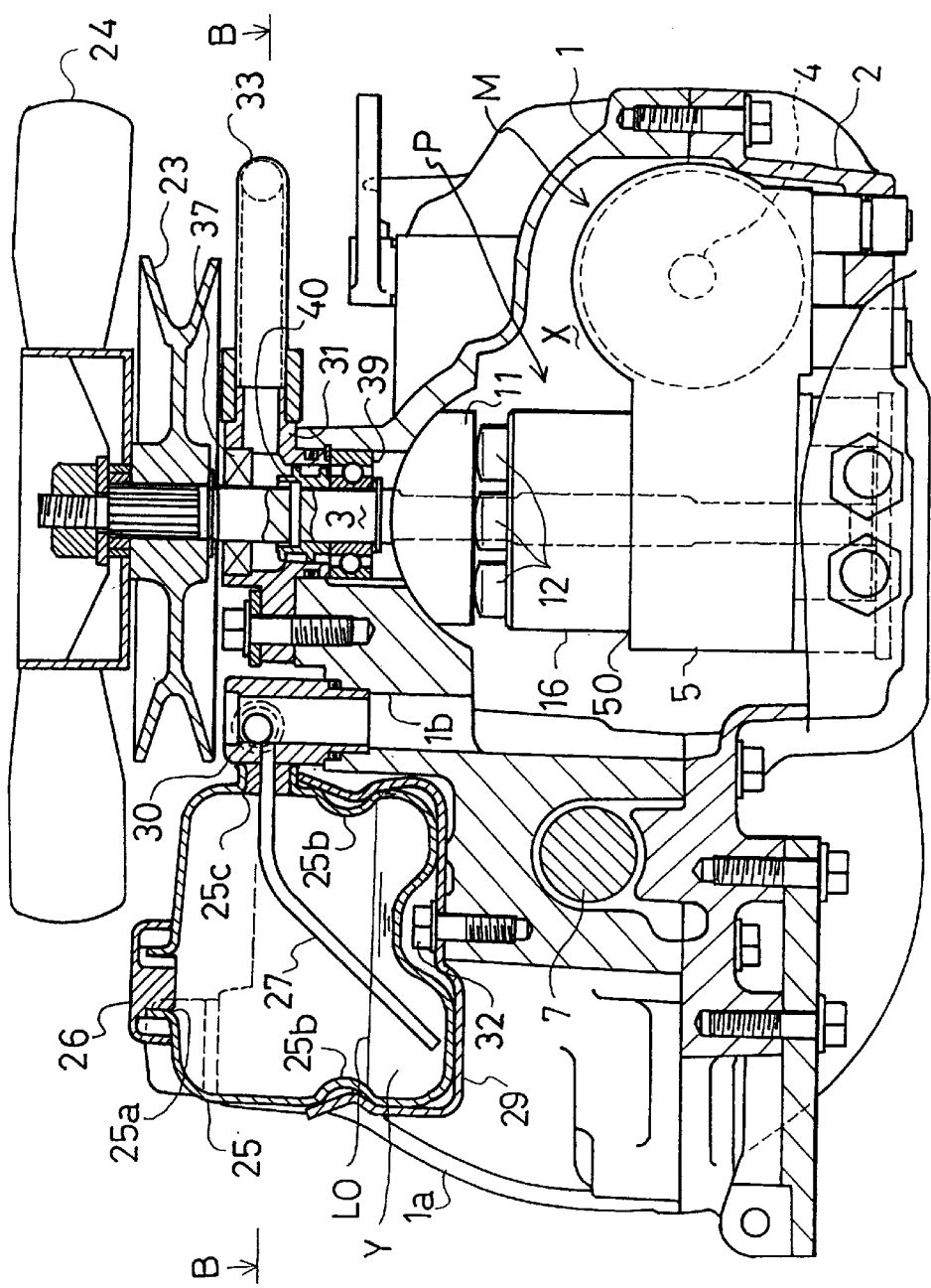
FIG. 16 is a section taken along line 16—16 in FIG. 15.
Figure 17:
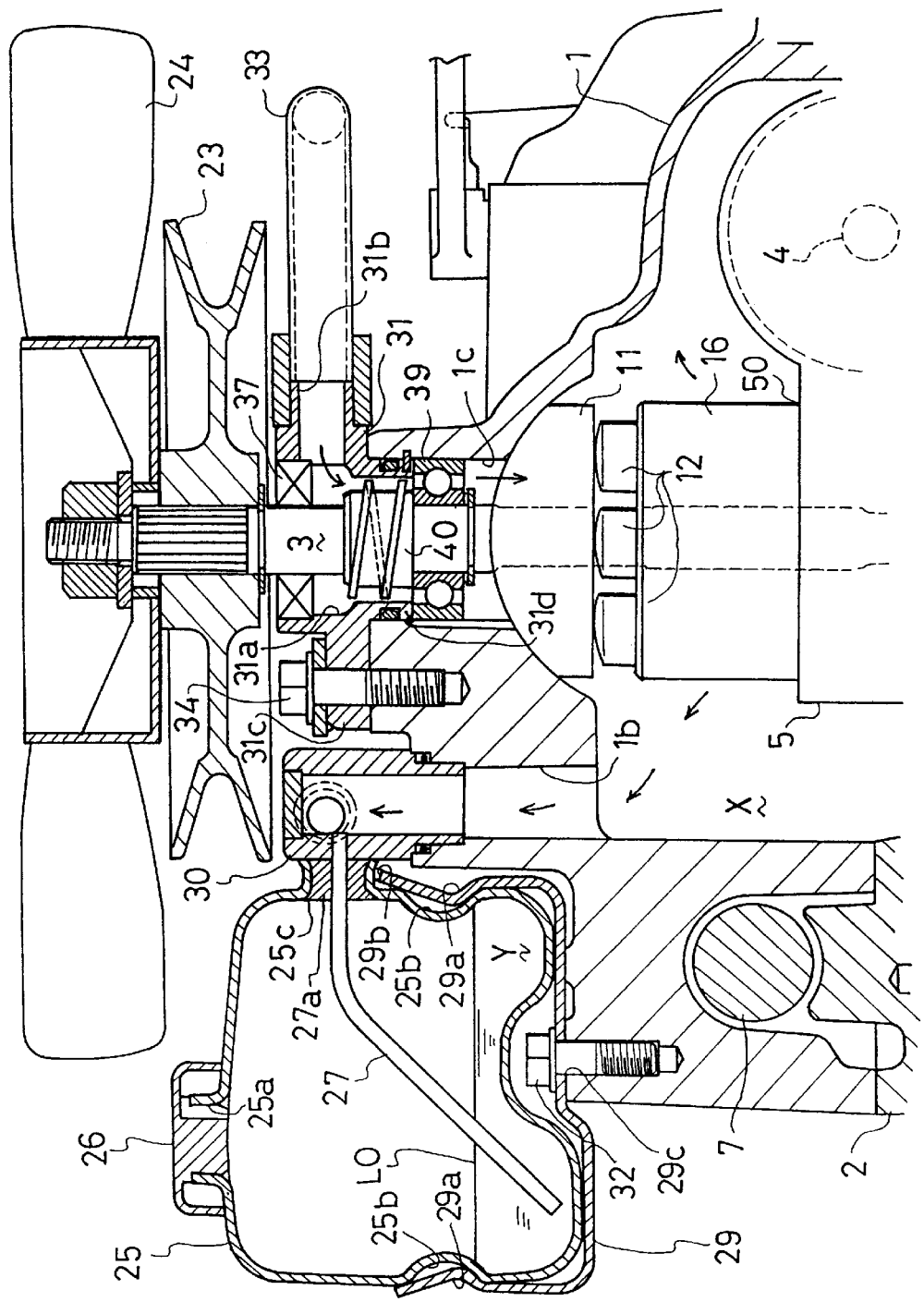
FIG. 17 is an enlarged view of first and second couplings shown in FIG. 16.
Figure 18:
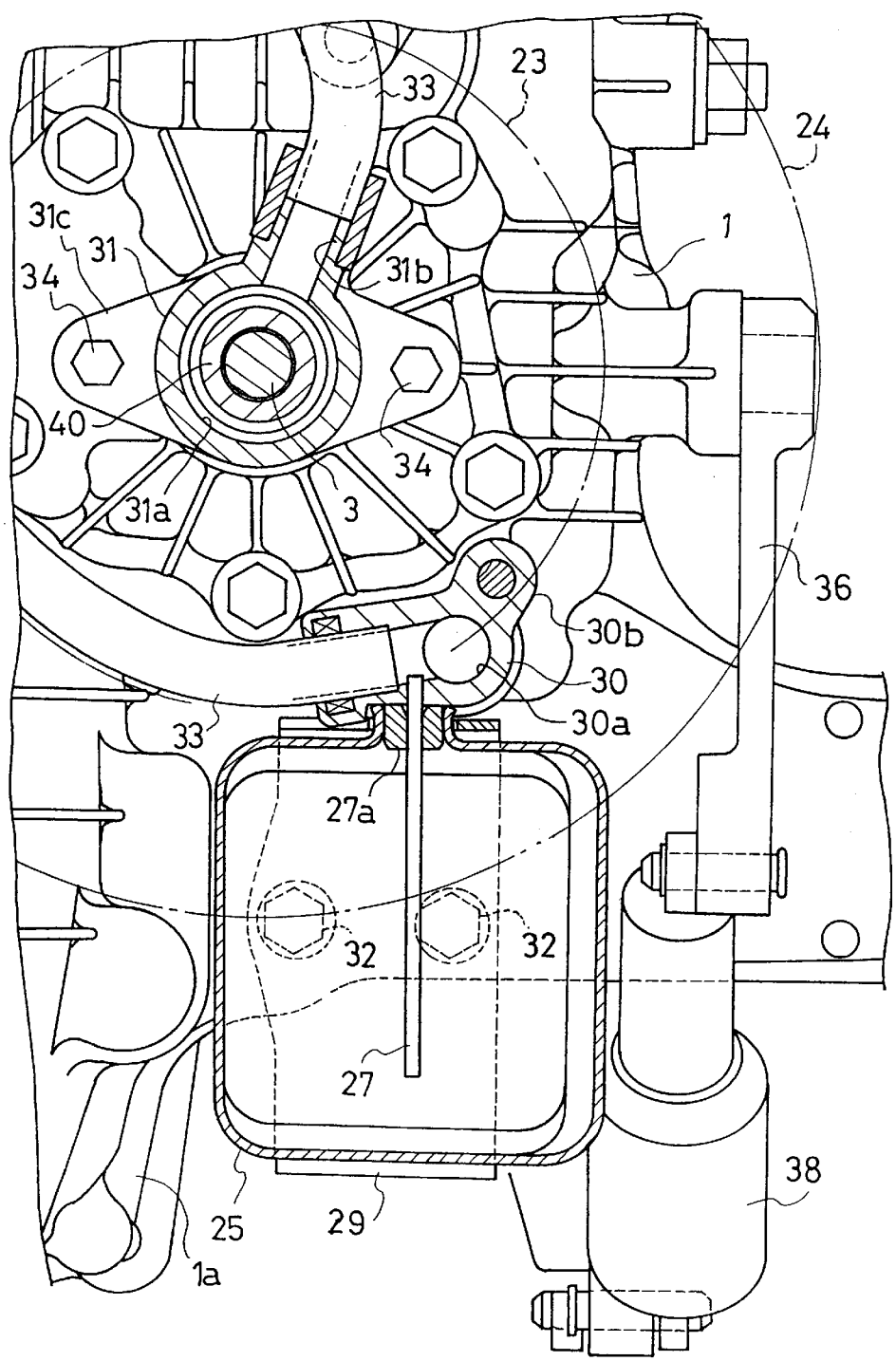
FIG. 18 is a section taken along line 18—18 in FIG. 16.

Referring to FIGS. 11, 12 and 14, a coupling 30' includes an L-shaped oil channel 30'a. A lower opening end of channel 30'a is inserted into opening 1b of housing 1 in fluid communication with sump X formed in the housing. As shown in FIG. 14, a side of coupling 30' includes a fixing portion 30'b having an oil hole 30'c fluidly communicating with channel 30'a. Fixing portion 30'b is affixed to housing by screws (not shown). The other end of siphon 27 is inserted into hole 30'c. Thus, sump X and sump Y communicate with each other through coupling 30' and siphon 27.

As mentioned above, one end of siphon 27 is submerged in sump Y, whereby an oil level L0 of sump Y is lower than the level of oil in coupling 30'. The volume of the oil of sump X increases as the temperature of oil increases during operation of the HST and the transmission. The increased volume of oil is directed into reservoir 25 through coupling 30' and siphon 27. As the volume of oil in sump X decreases when its temperature decreases, the oil returns to sump X through siphon 27 and coupling 30' from sump Y. Thus, the volume of the oil of sump X is regulated in a simple manner.

Explanation will now be given on an axle driving apparatus in accordance with a third embodiment of the present invention, which incorporates the features of both the first and second embodiments discussed above. With reference to FIGS. 15–21, an axle driving apparatus includes a first oil sump X formed within the housing and second oil sump Y disposed external to the housing. The oil of first sump X flows from the housing and is cooled by cooling fan 24. Second sump Y is disposed below the cooling fan. In this embodiment, the oil drawn out from first sump X is in also communication with the oil of second sump Y.

Similar to the first embodiment discussed above, the housing includes first coupling 30 and second coupling 31. Conduit 33 extends between couplings 30 and 31 and is disposed below fan 24. Similar to the second embodiment discussed above, reservoir 25 is mounted on the housing by attaching member 29 and first and second fixtures 25b and 29a, whereby reservoir 25 is disposed in the air-cooled area below fan 24.

Figure 19:
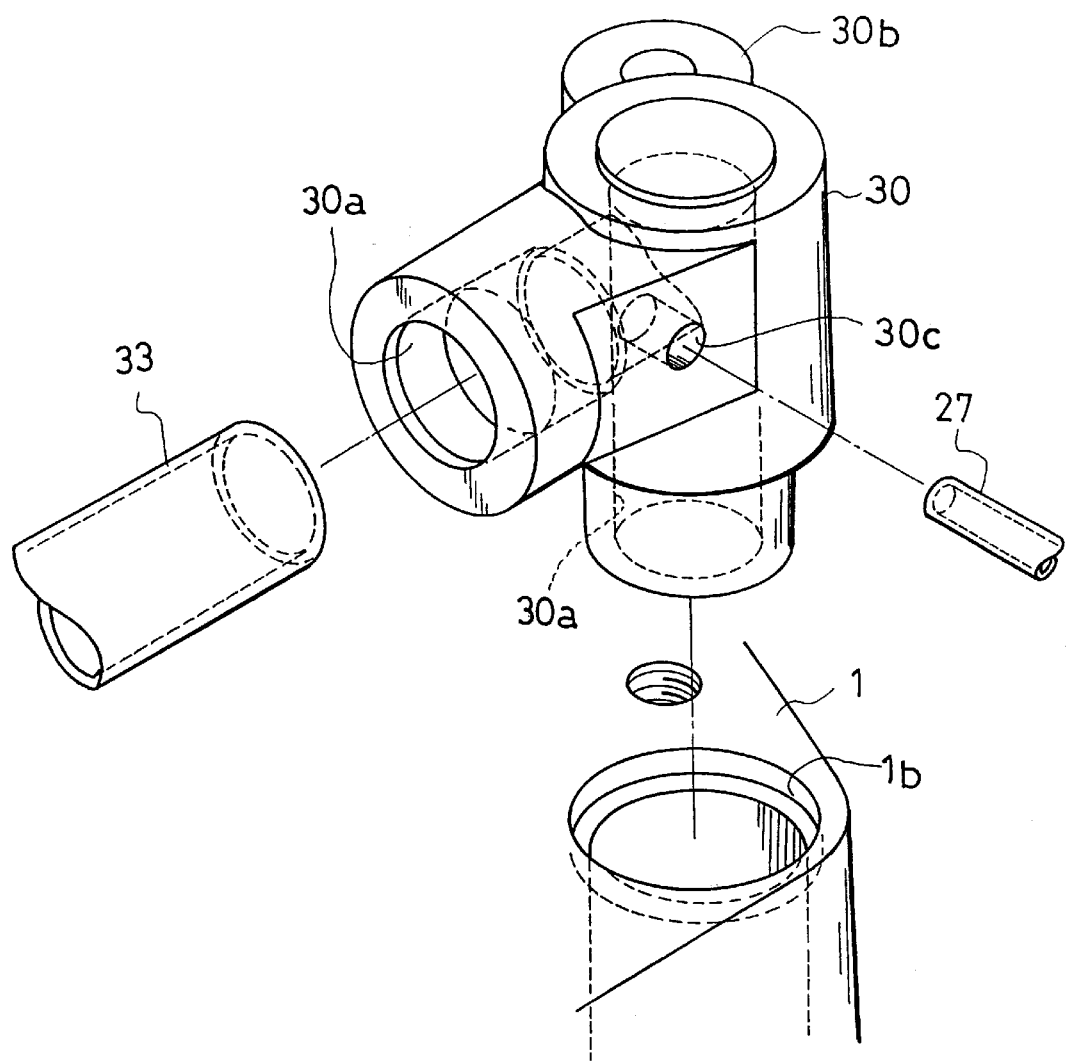
FIG. 19 is a perspective view of a first coupling of the third embodiment of the present invention.
Figure 20:
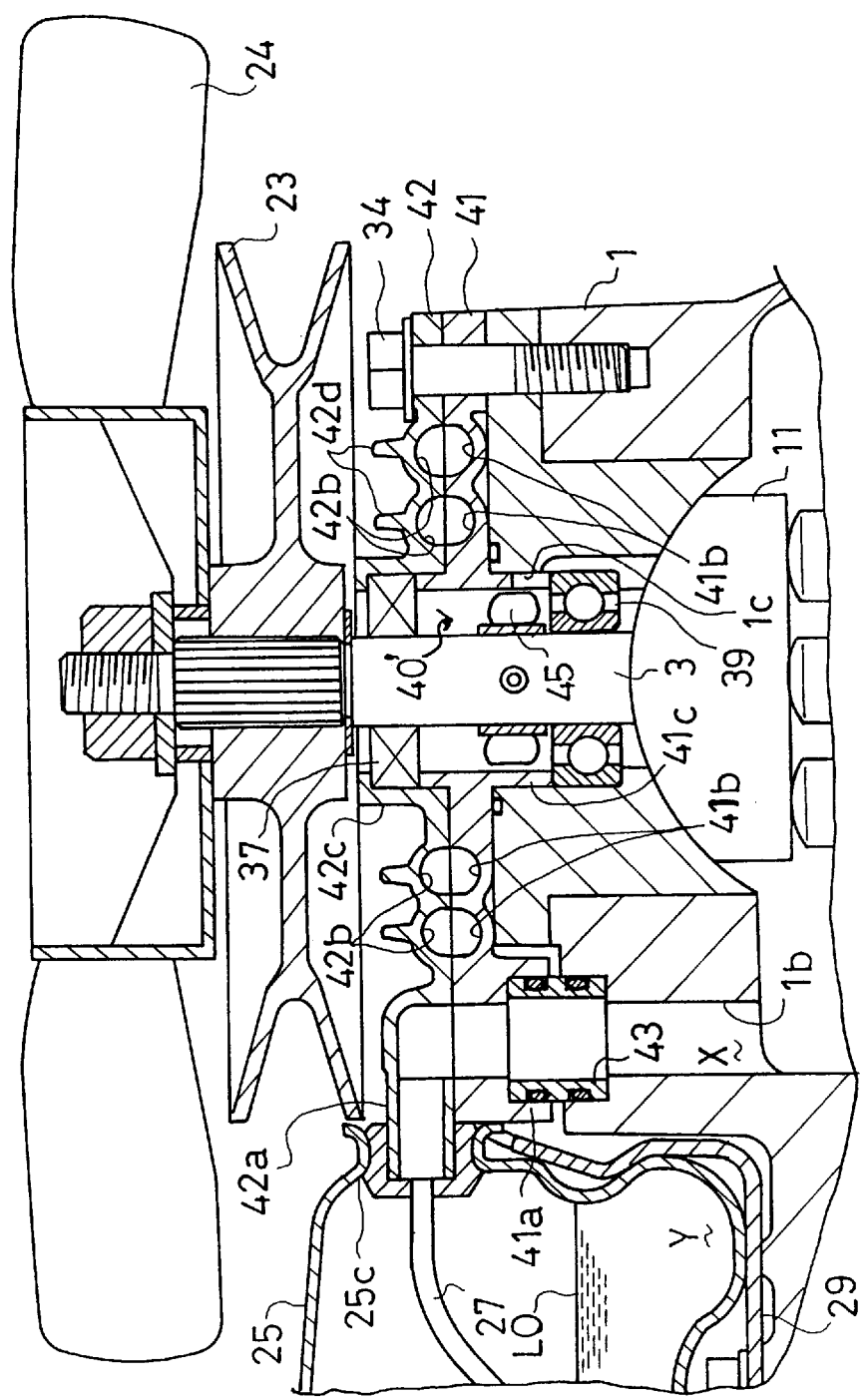
FIG. 20 is a sectional side view showing a modification of the third embodiment of the present invention, wherein a plate member forms an oil passage.
Figure 21:
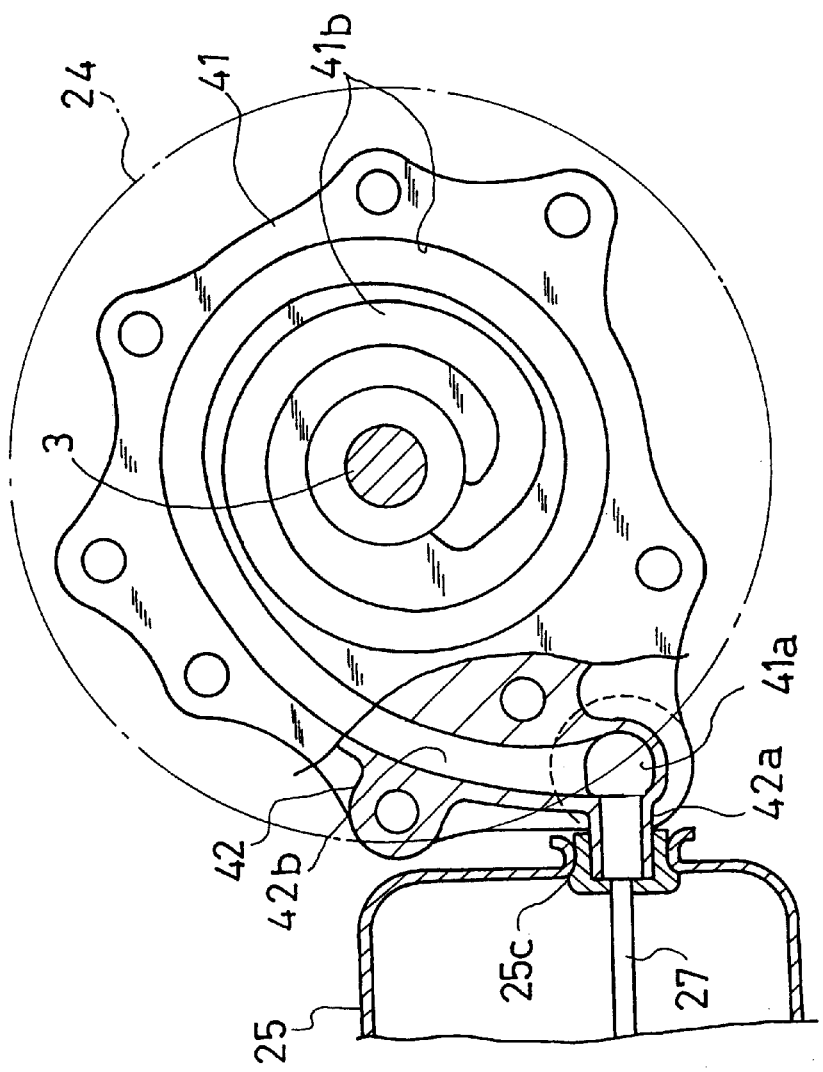
FIG. 21 is a plan view partly in section of the plate member shown in FIG. 20.

As shown in FIG. 19, a side surface of coupling 30 includes a hole 30c in communication with channel 30a. Siphon 27 is inserted into hole 30c, whereby sump Y of reservoir 25 communicates with sump X through siphon 27. Oil level L0 of second sump Y is lower than the oil level of first sump X, i.e., the level of oil flowing through conduit 33. When the volume of the oil of sump X increases in proportion to increased operating temperature of the HST and the transmission, the increased volume of oil is directed into reservoir 25 through coupling 30 and siphon 27. As volume of the oil of sump X decreases when as the temperature decreases, the oil is returned to sump X through siphon 27 and coupling 30 from sump Y.

Similar to the first embodiment described above and as shown in FIGS. 20 and 21, a plate member including upper plate 41 and lower plate 42 may be disposed on the upper surface of housing 1 instead of conduit 33. In the case that the axle driving apparatus includes upper and lower plates 41 and 42 in combination with sumps X and Y, a channel of the plate member must be in communication with reservoir 25. Thus, plate 42 forms a port 42a in a side end thereof above pipe 43. Siphon 27 connects with port 42a for fluidly communicating sumps X and Y with each other through the plate member channel and siphon 27.

Since the axle driving apparatus in accordance with the third embodiment incorporates the features of both the first and second embodiments, the third embodiment also has the advantages and benefits of both. Thus, the oil of sump X is air-cooled by fan 24 while flowing through conduit 33 (or the channel formed in plates 41 and 42) and the oil of sump Y is simultaneously air-cooled by fan 24. The oil flows between sumps X and Y. Thus, the oil of the axle driving apparatus is cooled more effectively.

Although the invention has been described with reference to several different embodiments, these embodiments are merely exemplary and are not intended to limit the scope of the present invention which is defined solely by the appended claims.

What is claimed is:

1. A hydrostatic transmission comprising:

a housing defining a chamber containing transmission fluid:

a pump disposed in said chamber;

an input shaft for driving said pump;

a motor disposed in said chamber fluidly connected to said pump and driven by said pump;

an output shaft connected to said motor for transmitting mechanical motion of said motor;

a fluid reservoir in communication with said chamber for permitting expansion of said transmission fluid, said reservoir including a siphon for connecting said chamber and an inner fluid sump of said fluid reservoir.

2. The hydrostatic transmission as set forth in claim 1, wherein an end of said siphon is attached to said housing and another end of said siphon is immersed in said inner fluid sump of said fluid reservoir.

3. The hydrostatic transmission as set forth in claim 1, wherein said fluid reservoir further comprises:

a fixture portion formed by said fluid reservoir, and an attaching member fixed onto said housing, wherein said fixture portion detachably engages with said attaching member.

4. The hydrostatic transmission as set forth in claim 3, wherein said fluid reservoir is made of synthetic resin.

5. An axle driving apparatus comprising:

a housing defining a chamber containing transmission fluid;

axles disposed within said housing, said axles differentially connected by a differential gear unit;

a pump disposed in said chamber;

an input shaft extending through said housing for driving said pump;

a motor disposed in said chamber fluidly connected to said pump and driven by said pump;

an output shaft connected to said motor for transmitting mechanical motion of said motor to said differential gear unit;

a fluid reservoir in communication with said chamber for permitting expansion of said transmission fluid, said reservoir including a siphon for connecting said chamber and an inner fluid sump of said fluid reservoir.

6. The axle driving apparatus as set forth in claim 5, wherein an end of said siphon is attached to said housing and another end of said siphon is immersed in said inner fluid sump of said fluid reservoir.

7. The axle driving apparatus as set forth in claim 5, wherein said fluid reservoir further comprises:

a fixture portion formed by said fluid reservoir, and an attaching member fixed onto said housing, wherein said fixture portion detachably engages with said attaching member.

8. The axle driving apparatus as set forth in claim 7, wherein said fluid reservoir is made of synthetic resin.

9. The axle driving apparatus as set forth in claim 5, wherein said fluid reservoir is disposed adjacent a portion of said housing containing said differential gear unit.

* * * * *